(12) United States Patent
Fischperer

(10) Patent No.: US 6,286,434 B1
(45) Date of Patent: Sep. 11, 2001

(54) PROPULSION SYSTEM FOR A MAGNETIC LEVITATION VEHICLE

(75) Inventor: Rolf Fischperer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/445,482
(22) PCT Filed: Jun. 3, 1998
(86) PCT No.: PCT/EP98/03315
  § 371 Date: Mar. 9, 2000
  § 102(e) Date: Mar. 9, 2000
(87) PCT Pub. No.: WO98/55338
  PCT Pub. Date: Dec. 10, 1998

(30) Foreign Application Priority Data

Jun. 6, 1997 (DE) ............................................. 197 23 959

(51) Int. Cl.⁷ ..................... B60L 13/04; B60L 13/03; B60L 13/10; H02K 41/02
(52) U.S. Cl. .................. 104/290; 104/292; 104/294; 104/282; 310/12; 310/13; 318/135
(58) Field of Search ........................... 104/281, 282, 104/284, 286, 290, 292, 294; 310/12, 13; 318/135

(56) References Cited

U.S. PATENT DOCUMENTS

| 3,664,268 | * | 5/1972 | Lucas et al. | 104/286 |
|---|---|---|---|---|
| 3,842,750 | * | 10/1974 | Miericke | 104/285 |
| 3,861,321 | * | 1/1975 | Goodnight et al. | 104/284 |
| 3,882,789 | * | 5/1975 | Simon et al. | 104/286 |
| 3,892,185 | * | 7/1975 | Guderjahn | 104/286 |
| 3,903,808 | * | 9/1975 | Foldes | 104/288 |
| 3,937,148 |   | 2/1976 | Simpson . |  |
| 5,208,496 | * | 5/1993 | Tozoni et al. | 310/12 |
| 5,467,718 | * | 11/1995 | Shibata et al. | 104/284 |
| 5,569,987 | * | 10/1996 | Fischperer | 318/135 |
| 5,605,100 |   | 2/1997 | Morris et al. . |  |
| 5,628,252 | * | 5/1997 | Kuznetsov | 104/284 |
| 5,712,514 | * | 1/1998 | Fischperer et al. | 307/69 |
| 5,717,261 | * | 2/1998 | Tozoni | 310/12 |

FOREIGN PATENT DOCUMENTS 2 150 779   4/1973 (FR) .

OTHER PUBLICATIONS

L. Honds et al., "A linear d.c. motor with permanent magnets", Philips tech. Rev. 40, pp. 329–337, 1982 No. 11/12, Described in the specification.

K. Heinrich, et al., Magnetbahn Transrapid Die neue Dimension des Reisens, Hestra–Verlag Darmstadt, 1989 ISBN 3–771–0208–3, pp. 76–79, Described in the Specification.

* cited by examiner

Primary Examiner—Joseph D. Pape
Assistant Examiner—G Blankenship
(74) Attorney, Agent, or Firm—Young & Thompson

(57) ABSTRACT

A propulsion system for a magnetically levitated vehicle is described. The propulsion system includes a drive and/or suspension magnet arrangement mounted in the vehicle, its drive magnets and/or suspension magnets being arranged with their magnetic axes that connect the two magnet poles running across the longitudinal direction of the guideway so that the magnet poles arranged in succession in this longitudinal direction have the same polarity.

11 Claims, 4 Drawing Sheets

PROPULSION SYSTEM FOR A MAGNETIC LEVITATION VEHICLE

FIELD OF THE INVENTION

The present invention relates to a propulsion system for a magnetically levitated vehicle.

BACKGROUND INFORMATION

A propulsion system for a magnetically levitated vehicle is described in, for example, from "Magnetbahn TRANSRAPID—Die neue Dimension des Reisens" (TRANSRAPID magnetic railway, the new dimension in travel) Hestra Verlag Darmstadt, 1989, ISBN 3-7771-0208-3, pages 76-79. The propulsion system of a magnetically levitated vehicle fulfills three functions, namely suspension, guidance and driving of the magnetically levitated vehicle on a guideway without contact. The propulsion system for it includes a suspension system, a guidance system and a drive system. The conventional guidance system includes a guidance magnet arrangement with the guidance magnets being arranged laterally so that the magnetic flux runs perpendicular to the longitudinal direction of the lateral guide rails in the vehicle, thereby ensuring lateral guidance of the magnetically levitated vehicle. Pairs of suspension magnets mounted in the lower area of the suspension frame of the magnetically levitated vehicle assume the suspension function. The required induction also provides the energization for the drive, so that the suspension system and the drive system are formed by one and the same magnet arrangement and the functions are mutually interdependent. Core assemblies are provided in the guideway for these suspension and drive magnet arrangements. The core assembly provided for the suspension and drive magnets contains a current-carrying traveling-field winding and forms the stator of a linear synchronous long-stator drive.

BACKGROUND OF THE INVENTION

U.S. Pat. No. 5,605,100 describes a propulsion system for a magnetically levitated vehicle, where the drive magnets mounted in the vehicle together with current conductors provided in the guideway form a d.c. drive system. The drive magnets are arranged in such a way that they generate a horizontal magnetic field which passes through the guideway stator holding the electric conductors. The guideway is therefore subdivided into a plurality of small sections, each being supplied with a direct current that can be switched on and off, so that only the electric conductors in the vicinity of the two magnet poles of a drive magnet surrounding the stator are electrically conducting. With this conventional propulsion system, each section of the stator must be smaller than the width of the drive magnet, because otherwise the current is displaced by the drive magnet and flows in areas of the stator where it cannot contribute toward the development of thrust. This yields the necessity of using a plurality of high-speed electronic switches, leading to high investment and maintenance costs.

A linear d.c. drive system described in Philips techn. Rev. 40, 1982, No. 11/12, pp. 329–337, has a drive magnet on opposite sides of a linear stator provided with a coil winding, with its magnetic axis in each case running horizontally, so that one pole of the drive magnet faces the stator and the other pole of the drive magnet faces away from the stator. Therefore, only a portion of the magnetic field generated by the drive magnet contributes toward the creation of linear thrust. Furthermore, additional iron cores must also be arranged on the outsides of the guideway to prevent portions of the magnetic field generated by the drive magnets and facing away from the stator from flowing over the stator in reverse, thus having a negative effect on thrust.

SUMMARY OF THE INVENTION

An object of the present invention is to provide a propulsion system for a magnetically levitated vehicle that reduces the technical complexity particularly of the equipment required for a great length on the guideway, including in particular guideway, stator and feeder cable.

According to the present invention, this object is achieved by providing a propulsion system having a drive system which includes a drive magnet arrangement mounted in the vehicle, a linear d.c. motor being formed with a stator provided with a winding and extending in the longitudinal direction of the guideway. Drive magnets are arranged with their magnetic axes that connect the two magnet poles running across the longitudinal direction of the guideway so that the magnet poles arranged in succession in the longitudinal direction have the same polarity, and the magnet poles belonging to a drive magnet are each arranged on one side of the stator so they are facing the stator.

The magnets in the vehicle required for driving are thus arranged so that they do not induce any alternating fields in the guideway. In other words, the magnetic flux induced in the guideway has the same direction over the entire length of the vehicle, and there is no change of polarity as the magnetically levitated vehicle passes by.

Since the magnet poles of each drive magnet are arranged on one side of the stator and are facing it, the largest possible portion of the magnetic field running outside the drive magnet is injected into the stator and is thus effective in generating thrust.

Since the drive magnets in the stator do not induce any alternating fields in passing by, the stator can be made of solid ferromagnetic steel. This reduces the cost of manufacturing the stator, because no core assemblies or screw connections are required.

Direct currents are supplied for operating the linear d.c. motor, so this also eliminates the power inverters and transformers in the substations and the respective switchgear. In addition, the reactive power demand approaches zero. Furthermore, a very simple control is possible, because it is not necessary to determine and process the frequency and phase. This greatly simplifies the data transfer between the vehicle and the substation required for the operation of the magnetically levitated vehicle. Since no alternating fields are induced, there is also no hysteresis loss.

The drive magnets may be arranged vertically with their magnetic axes running between the two magnet poles.

In an alternative embodiment of the present invention, the drive magnets may also be arranged horizontally.

In an advantageous embodiment of the present invention, the drive magnet arrangement contains pairs of opposing drive magnets with the stator arranged between them. This measure makes it possible to achieve a high propulsion force with a relatively low stator current. This reduces the losses on the cables.

The stator may have two helical windings arranged side by side in the longitudinal direction or one above the other. In this way, each of the poles of the magnet can contribute toward the drive of the vehicle, and a simple stator design is possible. As an alternative, it is also possible for the stator winding to form a figure eight in the longitudinal direction as seen from above.

In another embodiment of the present invention with a vertical arrangement of the drive magnets, the drive system is also designed as a guidance system. This permits simple control of the lateral guidance of the magnetically levitated vehicle which is completely decoupled from the drive function, although the same parts are used for the drive and for lateral guidance.

With a horizontal arrangement of the drive magnets, the drive system is may be also designed as a suspension system. This permits simple control of the suspension system of the magnetically levitated vehicle which is completely decoupled from the drive function, although the same parts are used for the drive and for suspension.

In an especially advantageous embodiment of the present invention, the suspension magnets of a suspension magnet arrangement mounted in the vehicle are arranged horizontally with their magnetic axes running between the two magnet poles and running across the longitudinal direction of the guideway, in particular beneath the guideway, so that the magnet poles arranged in succession in the longitudinal direction have the same polarity. This measure also prevents alternating fields from developing in the guideway, so a ferromagnetic mounting plate can be used as the guideway.

DESCRIPTION OF THE PREFERRED EMBODIMENTS

Figure 1:
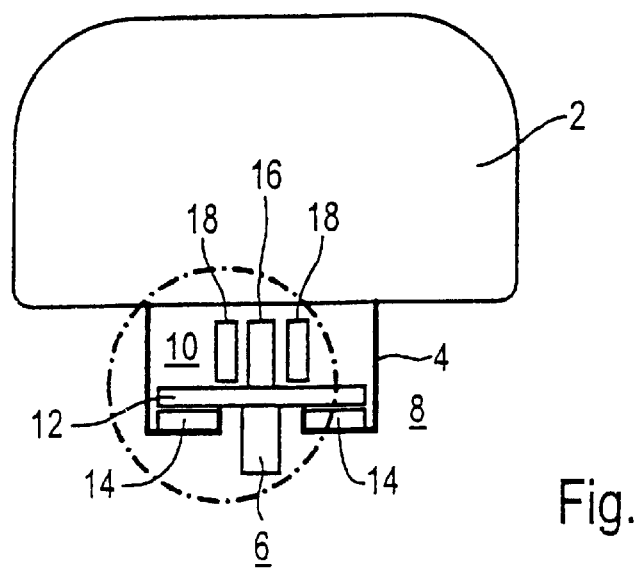
FIG. 1 shows a schematic diagram of a propulsion system according to the present invention.

As shown in FIG. 1, a magnetically levitated vehicle 2 with its suspension frame 4 is guided and suspended on a guideway 6. A propulsion system of magnetically levitated vehicle 2 includes a suspension system 8 and a drive system 10. Suspension system 8 is formed by a ferromagnetic guideway plate 12 and suspension magnet arrangements 14 mounted in suspension frame 4 and arranged on both sides of a guideway support 16 beneath the guideway plate.

Drive system 10 includes a stator 16, forming a linear d.c. motor with a drive magnet arrangement 18 in the vehicle. Drive system 10 is also designed as the guidance system for lateral guidance of magnetically levitated vehicle 2.

Figure 2:
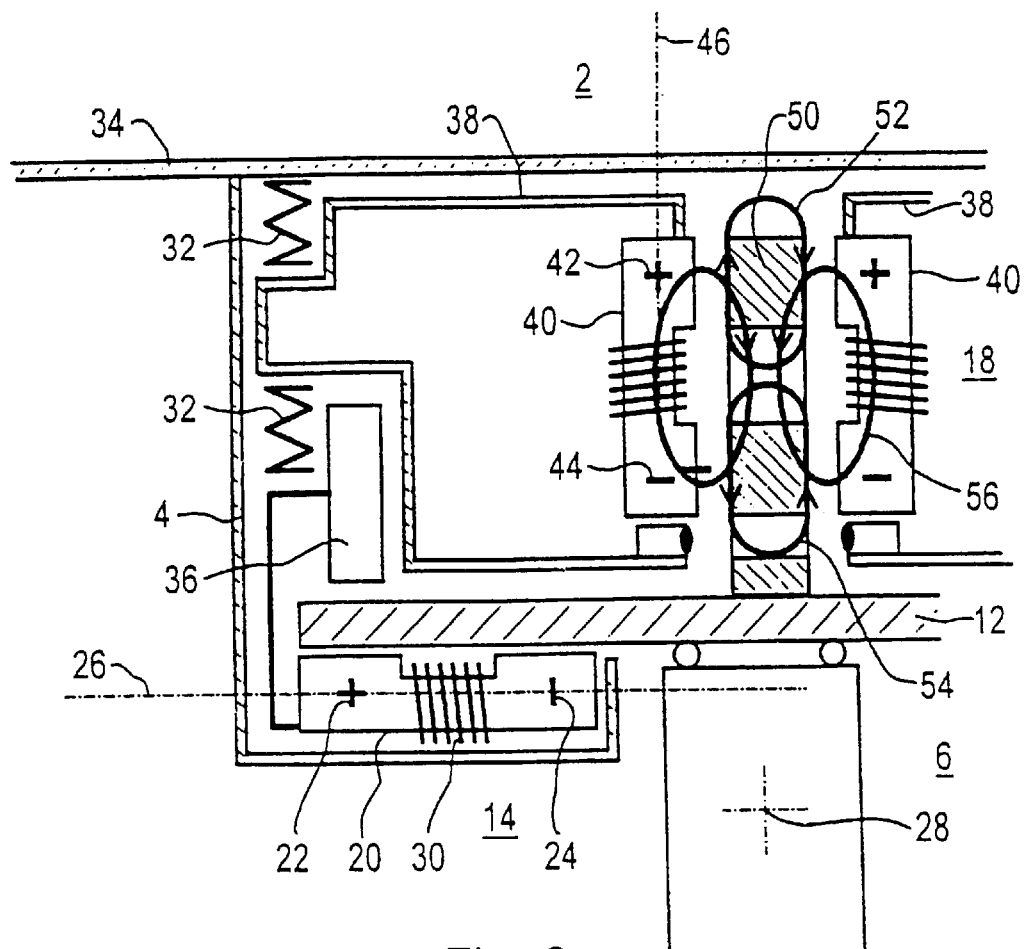
FIG. 2 shows an enlarged diagram of the propulsion system.

It can be seen in an enlarged diagram according to FIG. 2 that suspension magnet arrangement 14 has suspension magnets 20 with an iron core, preferably U-shaped, and its magnetic axis 26 running between two magnet poles 22 and 24 runs across longitudinal direction 28 of guideway 6. In the diagram according to FIG. 2, this longitudinal direction 28 runs perpendicular to the plane of the drawing. A plurality of suspension magnets 20 are arranged in succession in this longitudinal direction 28, with magnet poles 22 and 24 arranged in succession each having the same polarity.

Thus, as magnetically levitated vehicle 2 passes by, i.e., as it moves in longitudinal direction 28, no alternating magnetic fields are generated in guideway plate 12, i.e., there is no remagnetization, so a simple ferromagnetic steel plate can be used as guideway plate 12.

The suspension field required for suspension of magnetically levitated vehicle 2 can be created with the current flowing in a winding 30 of suspension magnet 20. A steel wheel 36 supported by springs 32 on vehicle bottom 34 and rigidly connected to suspension magnet arrangement 18 is used to carry vehicle 2 with any malfunctions that may occur.

An underfloor frame is mounted between springs 32, with drive magnets 40 of drive magnet arrangement 18, also having a U-shaped iron core, mounted there. Magnetic axis 46 running between two magnet poles 42 and 44 of drive magnets 40 is oriented perpendicular to guideway plate 12 and perpendicular to longitudinal direction 28 of guideway 6. A plurality of drive magnets 40 are arranged in succession in longitudinal direction 28 so that magnet poles 42 and 44 arranged in succession each have the same polarity. In other words, drive magnets 40 arranged in succession are oriented identically. Each drive magnet 40 has an opposing drive magnet 40 arranged in mirror symmetry, so that drive magnet arrangement 18 has pairs of opposing drive magnets 40.

Between the pairs of opposing drive magnets 40 there is a stator 50, accommodating two d.c. windings 52 and 54 in the example in the figure. Drive magnets 40 are thus arranged so that both magnet poles 42, 44 of each drive magnet 40 are on one side of stator 50 and are facing it. Thus, practically the entire magnetic field running outside a drive magnet 40 contributes to the creation of thrust.

Windings 52 and 54 are wound on stator 50 in a helical pattern in longitudinal direction 28. They are arranged side by side, in this embodiment one above the other on stator 50 so that one winding, namely winding,52 in the example shown in the figure, has the positive poles of drive magnets 40, and the other winding 54 has the negative poles of drive magnets 40. Direct current flows through windings 52 and 54 in opposite directions, so that a resulting driving or braking propulsion force or thrust is exerted parallel to longitudinal direction 28 by magnetic flux 56 created by drive magnets 40 in the stator.

A hydraulic brake arranged in underfloor frame 38 is used as the safety brake for braking magnetically levitated vehicle 2 in accidents or malfunctions.

No alternating magnetic fields are induced in stator 50 because magnetic axes 46 of drive magnets 40 are arranged across longitudinal direction 28, i.e, across the direction of movement of magnetically levitated vehicle 2. Stator 50, like guideway plate 12, can therefore be made of solid steel.

Drive system 10 is used as a guidance system at the same time. Drive magnets 40 together with stator 50 form pairs of guidance magnets, with the guidance function resulting from the difference between the magnetic flux of the right and left drive magnets 40. The drive function and guidance function are separated from one another because the drive function results from the sum of the magnetic fluxes of the right and left drive magnets 40 and the direct current flowing in windings 52 and 54. The force acting on magnetically levitated vehicle 2 across longitudinal direction 28 can be adjusted independently of the propulsion force acting in longitudinal direction 28, depending on the division of the flux densities among the pairs of drive magnets.

Since neither the suspension field nor the lateral guidance determines the drive flux, all three functions, i.e., the suspension function, the guidance function and the drive function can be optimized separately. In particular, a high propulsion force can be achieved by increasing the induction in this regard without having to supply a high stator current. This reduces the loss on the cables and less feeder cable is needed. In addition, it prevents feedback effects from the drive on the suspension and guidance function, e.g., with a winding short-circuit.

Instead of the embodiment illustrated in FIG. 2, where drive magnets 40 are arranged vertically, it is also possible in principle in an alternative embodiment to arrange the drive magnets horizontally likewise in opposing pairs with the same basic design of the stator between them. In such an alternative embodiment, the drive magnets are used for the suspension function.

Figure 3:
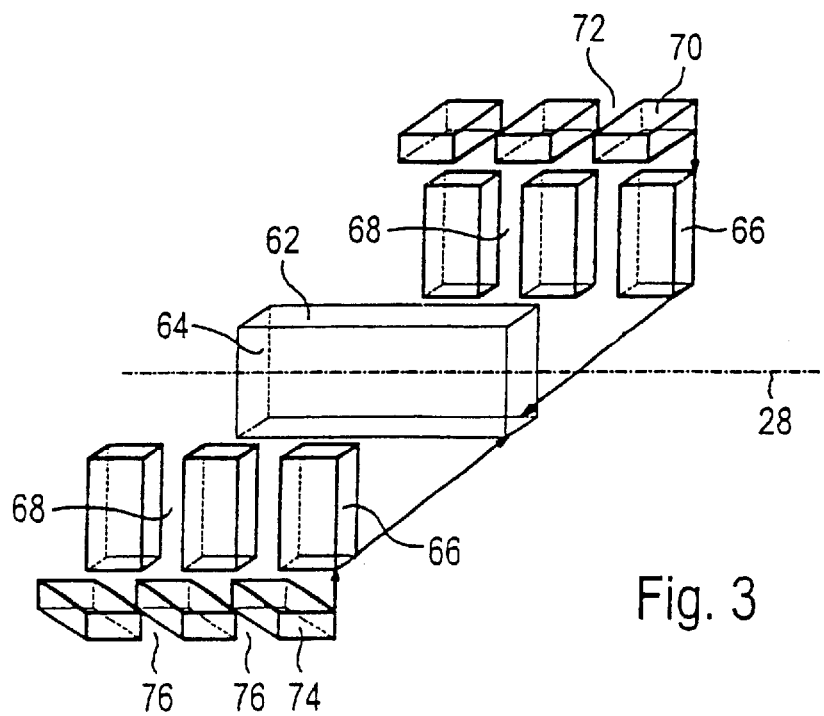
FIG. 3 shows the design of a stator in an example embodiment of the present invention.
Figure 4:
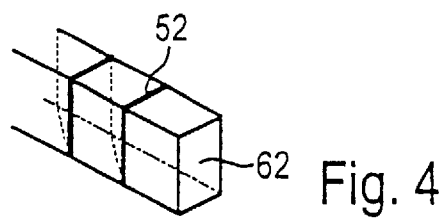
FIGS. 4 and 5 each show a suitable stator winding in each.

FIG. 3 illustrates the design of the top or bottom part of a stator. A cuboid core 62 is welded on its flat sides 64 to laminations 66 which are also cuboid and are spaced apart, thus forming lateral grooves 68 to accommodate the stator cable. On the one narrow side of core 62, opposing laminations 66 are joined together with cross connectors 70, thus forming a groove 72 on this narrow side, which also runs across longitudinal direction 28. On the opposite narrow side, cross connectors 74 are provided, which are arranged at an inclination to longitudinal direction 28 so that they form grooves 76 running at an inclination on the lower narrow side of core 62, establishing a connection to a neighboring groove 68. With this design, an approximately helical winding of the stator cable on core 62 can be achieved easily in terms of manufacturing technology. Two such cores 62 can be arranged side by side, forming two helical windings side by side. The winding obtained in this way is illustrated in FIG. 4, with only core 62 being shown without cross connectors and laminations in this embodiment.

Figure 5:
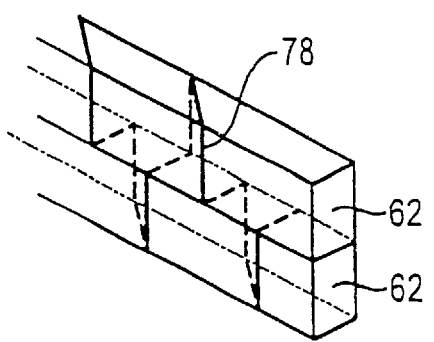

Instead of two helical windings 52, 54, a winding 78 in the form of a figure eight may also be provided, as illustrated schematically in FIG. 5.

Figure 6:
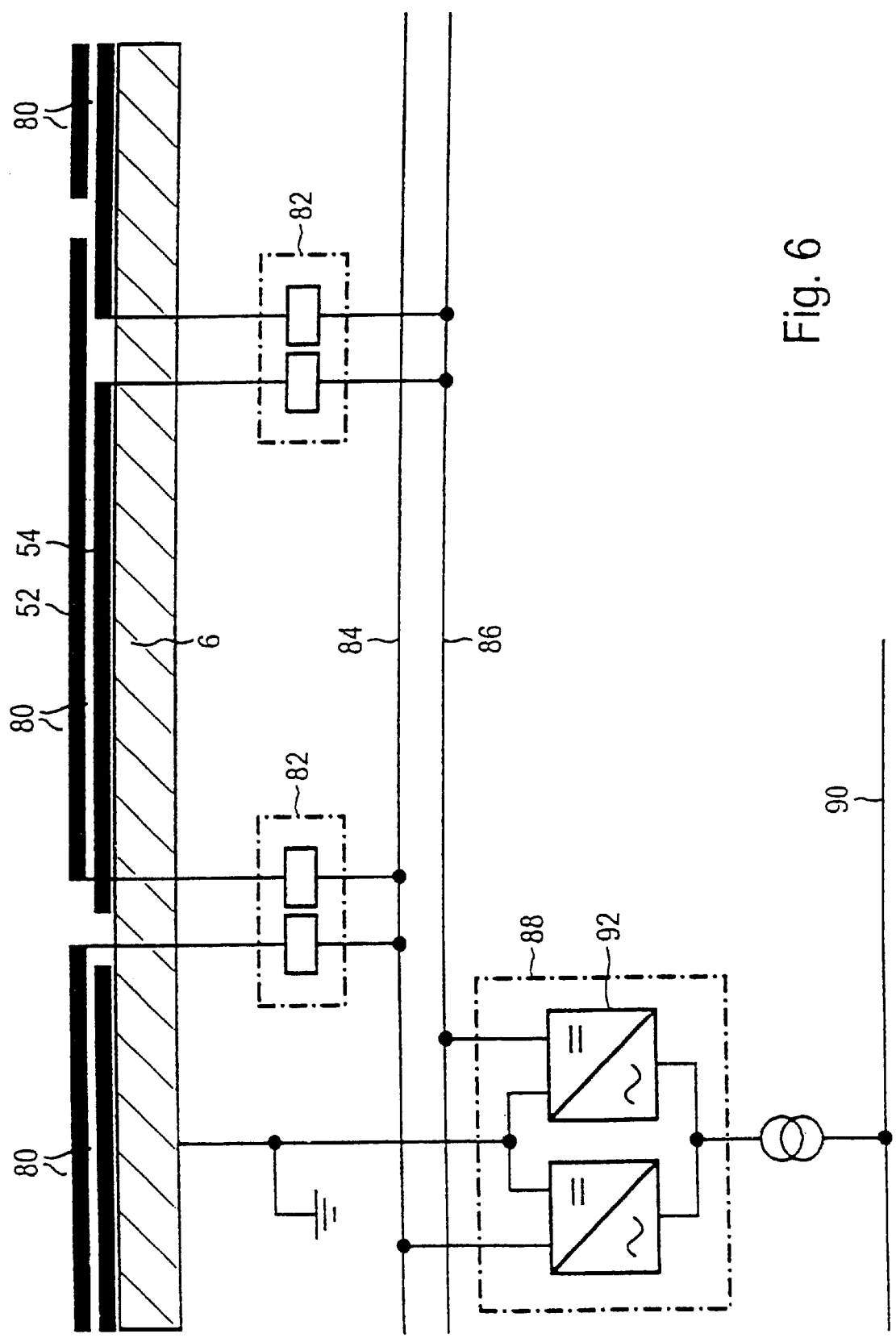
FIG. 6 shows a schematic block diagram of a power supply for the guideway.

According to FIG. 6, guideway 6 has a plurality of stator sections 80. Each stator section 80 has a stator (not shown in the figure) with two windings 52, 54. Windings 52, 54 are supplied with direct current over feeder cable 84 or 86 via connection points 82 in an alternating arrangement. Simple conductor bars may also be used instead of feeder cables. Feeder cables 84 and 86 are connected to a main network 90 by a substation 88. The direct current needed to supply the propulsion system is generated in this substation 88 via power rectifier 92.

Figure 7:
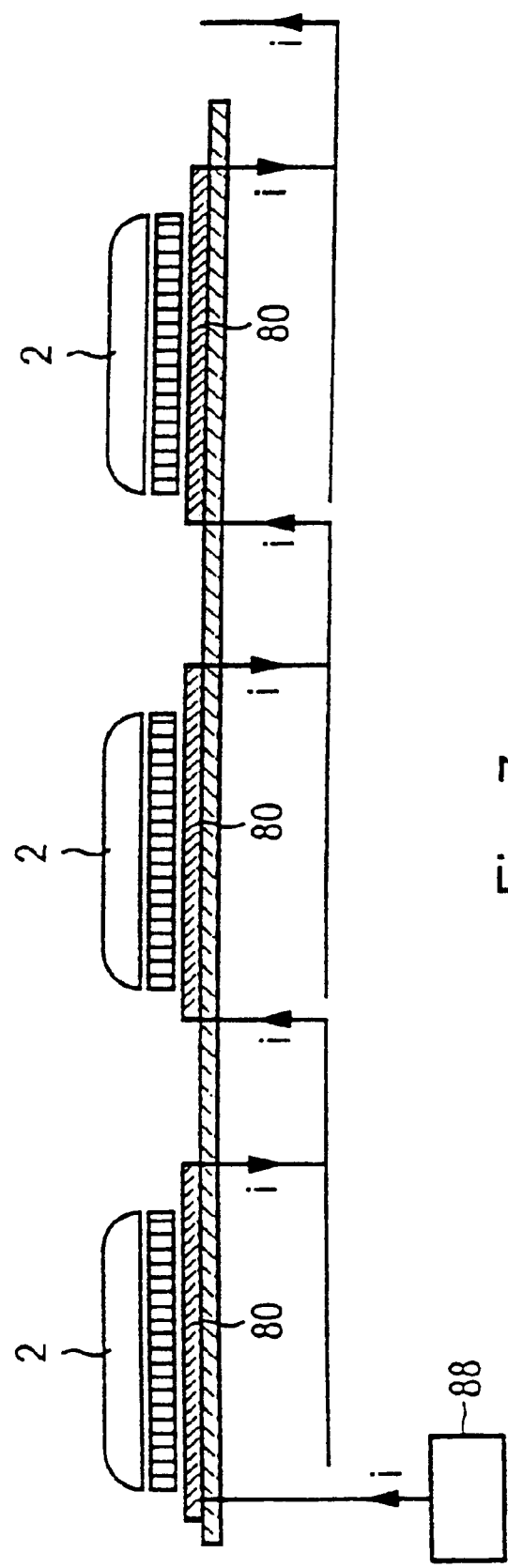
FIG. 7 shows a schematic block diagram of an advantageous arrangement for electric power supply for the guideway.

According to FIG. 7, it is also possible with a decentralized control from the vehicle to supply a plurality of stator sections 80 with current from a substation 88. Such a decentralized control is possible by controlling the current flowing in the windings of the drive magnets, i.e., by adjusting the induction of the drive magnets.

What is claimed is:

1. A propulsion system for a magnetically levitated vehicle, comprising:

a drive system including a drive magnet arrangement mounted in the vehicle and a stator, the drive magnet arrangement forming a linear d.c. motor with the stator, the stator being provided with a first winding, the drive magnet arrangement extending in a longitudinal direction of a guideway and including drive magnets, each of the drive magnets including two magnet poles and being arranged so that each magnetic axis connecting the two magnet poles of each of the drive magnets extends across the longitudinal direction of the guideway so that the magnet poles arranged in succession have the same polarity, both of the magnet poles of each the drive magnets being arranged on one side of the stator and facing the stator.

2. The propulsion system according to claim 1, wherein the drive magnets are arranged so that each magnet axis is vertical.

3. The propulsion system according to claim 1, wherein the drive magnets of the drive magnet arrangement are arranged in pairs of opposing drive magnets with the stator arranged between members of the pairs.

4. The propulsion system according to claim 3, wherein the stator is further provided with a second winding, the first winding and the second winding being helical in the longitudinal direction and being arranged side by side with respect to each other.

5. The propulsion system according to claim 1, wherein the first winding is arranged in a figure eight in the longitudinal direction.

6. The propulsion system according to claim 1, wherein the drive system is also a guidance system.

7. The propulsion system according to claim 1, further comprising:

a suspension magnet arrangement mounted in the vehicle and including suspension magnets, each of suspension magnets having two magnet poles and being arranged horizontally with each magnet axis connecting the two magnet poles of each of the suspension magnets running across the longitudinal direction of the guideway so that the magnet poles of the suspension magnets arranged in succession in the longitudinal direction have the same polarity.

8. The propulsion system according to claim 7, wherein the guideway includes a ferromagnetic guideway plate.

9. The propulsion system according to claim 8, wherein the suspension magnets are arranged on the vehicle beneath the guideway plate.

10. The propulsion system according to claim 1, wherein thrust for the magnetically levitated vehicle is adjusted centrally from a substation as a function of stator current.

11. The propulsion system according to claim 1, wherein thrust for the magnetically levitated vehicle is adjusted decentrally in the magnetically levitated vehicle by induction of the drive magnets.

* * * * *